United States Patent
Aiello

(10) Patent No.: US 7,484,124 B2
(45) Date of Patent: Jan. 27, 2009

(54) METHOD AND SYSTEM FOR FAULT PROTECTION IN COMMUNICATION NETWORKS, RELATED NETWORK AND COMPUTER PROGRAM PRODUCT

(75) Inventor: Alessandro Aiello, Turin (IT)

(73) Assignee: Telecom Italia S.p.A., Milan (IT)

(*) Notice: Subject to any disclaimer, the term of this patent is extended or adjusted under 35 U.S.C. 154(b) by 250 days.

(21) Appl. No.: 10/574,984

(22) PCT Filed: Oct. 9, 2003

(86) PCT No.: PCT/EP03/11196

§ 371 (c)(1),
(2), (4) Date: Apr. 7, 2006

(87) PCT Pub. No.: WO2005/041539

PCT Pub. Date: May 6, 2005

(65) Prior Publication Data

US 2007/0168756 A1   Jul. 19, 2007

(51) Int. Cl.
*G06F 11/00* (2006.01)
(52) U.S. Cl. .................................................... 714/33
(58) Field of Classification Search .................. 714/33
See application file for complete search history.

(56) References Cited

U.S. PATENT DOCUMENTS

| | | | | |
|---|---|---|---|---|
| 4,912,698 | A * | 3/1990 | Bitzinger et al. ............. | 370/244 |
| 5,805,785 | A | 9/1998 | Dias et al. | |
| 5,808,886 | A * | 9/1998 | Suzuki ........................... | 700/4 |
| 5,983,359 | A * | 11/1999 | Nota et al. ..................... | 714/10 |
| 6,028,996 | A * | 2/2000 | Sniderman et al. ............ | 703/28 |
| 6,078,957 | A | 6/2000 | Adelman et al. | |
| 6,088,328 | A | 7/2000 | McKnight | |
| 6,148,410 | A | 11/2000 | Baskey et al. | |
| 6,167,567 | A | 12/2000 | Chiles et al. | |
| 6,954,884 | B2 * | 10/2005 | Dean et al. ..................... | 714/51 |
| 7,114,095 | B2 * | 9/2006 | Milojicic et al. ............... | 714/13 |
| 7,117,390 | B1 * | 10/2006 | Klarer et al. .................... | 714/13 |
| 7,234,075 | B2 * | 6/2007 | Sankaran et al. ............... | 714/13 |

(Continued)

OTHER PUBLICATIONS

Shukla et al.; "Toss: Tonics for Operation Support Systems, System Management Using the World Wide Web and Intelligent Software Agents"; Network Operations and Management Symposium, IEEE, pp. 100-109, (1998).

(Continued)

*Primary Examiner*—Bryce P Bonzo
(74) *Attorney, Agent, or Firm*—Finnegan, Henderson, Farabow, Garrett & Dunner, L.L.P.

(57) ABSTRACT

A method of providing fault protection of special purpose devices included in at least one communication network and performing respective functions, includes the steps of providing a set of general purpose devices adapted to be configured to perform the respective functions and in the presence of a faulty condition in any of the respective functions of the special purpose devices, applying at least one of the general purpose devices in performing the respective function exposed to the faulty condition. Preferably the general purpose devices are configured for resource sharing; resources needed to perform a respective function exposed to a faulty condition can thus be transferred to a general purpose device in the set from another general purpose device in the same set. The set of general purpose devices is preferably arranged as a distributed system.

16 Claims, 3 Drawing Sheets

U.S. PATENT DOCUMENTS

Figure 3:
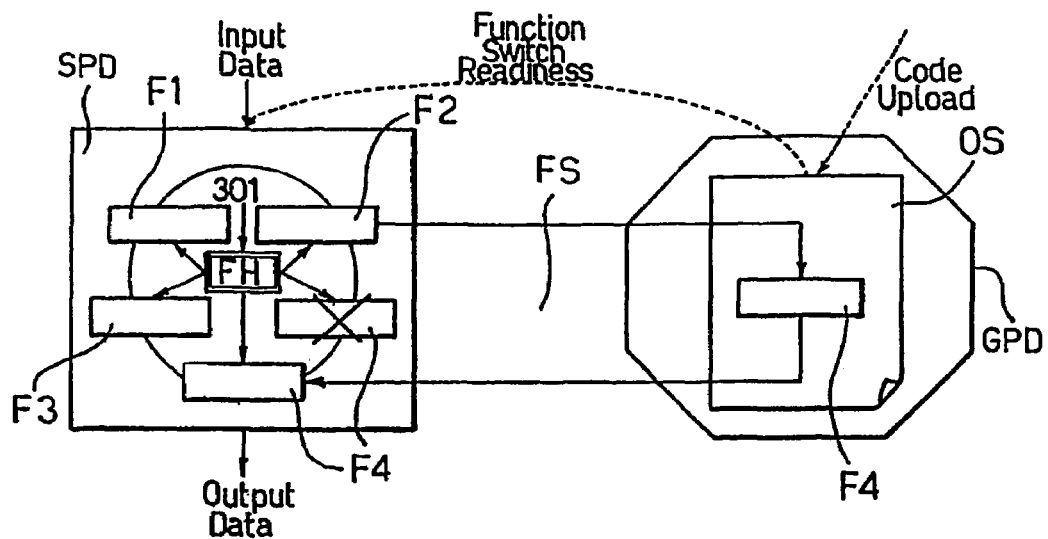

| | | | |
|---|---|---|---|
| 7,287,179 B2* | 10/2007 | Doyle et al. | 714/4 |
| 2001/0052042 A1* | 12/2001 | Wallach et al. | 710/103 |
| 2003/0005107 A1 | 1/2003 | Dulberg et al. | |
| 2004/0172574 A1* | 9/2004 | Wing et al. | 714/4 |
| 2004/0236987 A1* | 11/2004 | Greenspan et al. | 714/13 |
| 2005/0204188 A1* | 9/2005 | Whitney | 714/9 |
| 2007/0088980 A1* | 4/2007 | Greenspan et al. | 714/13 |

OTHER PUBLICATIONS

Taghelit et al.; "An Algorithm Providing Fault-Tolerance for Layered Distributed Systems"; ISMM International Workshop on Parallel Computing, 15 sheets, (1991).

* cited by examiner

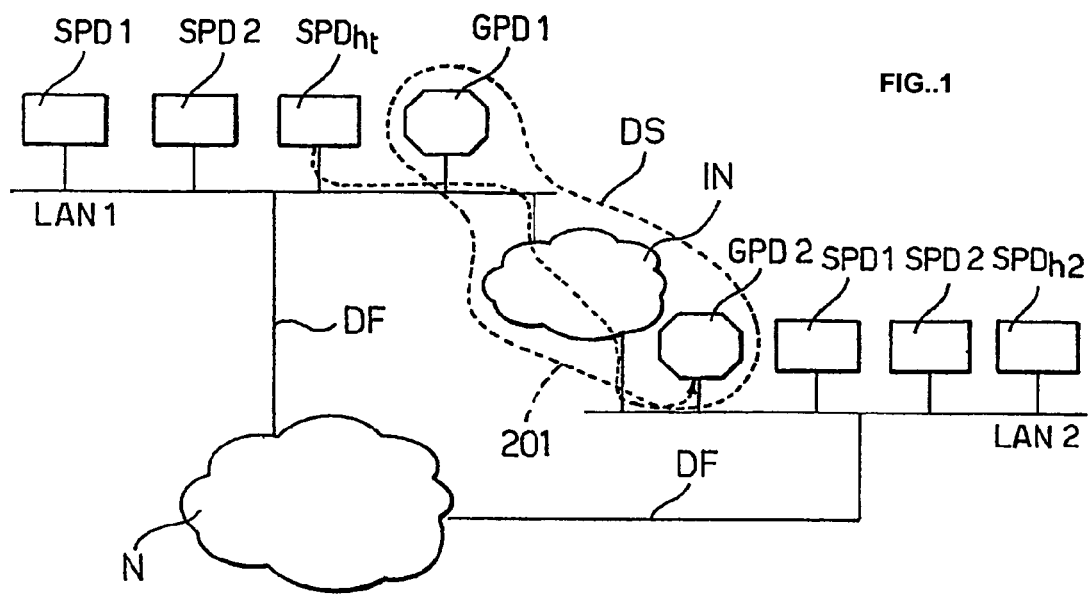
FIG..1
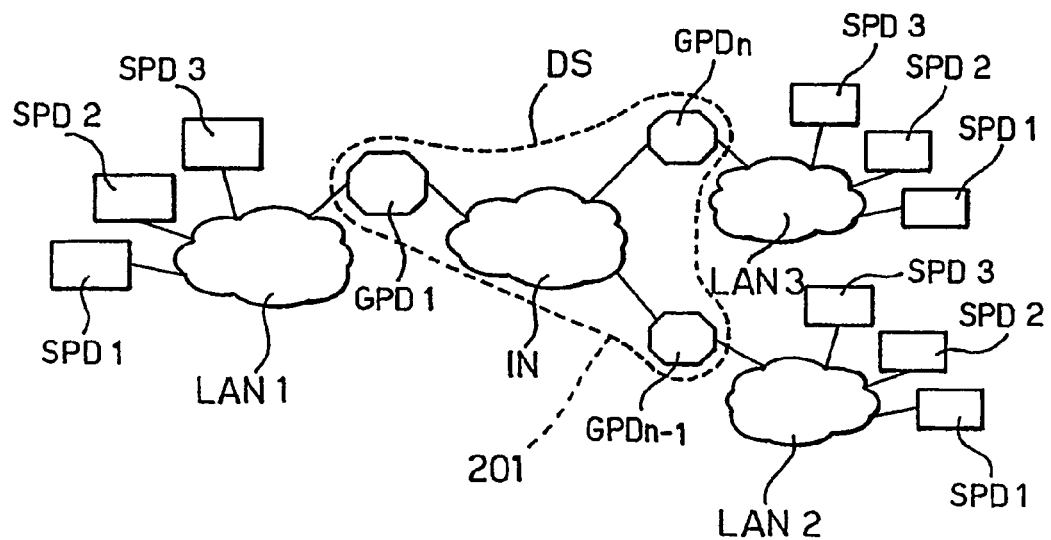
FIG..2

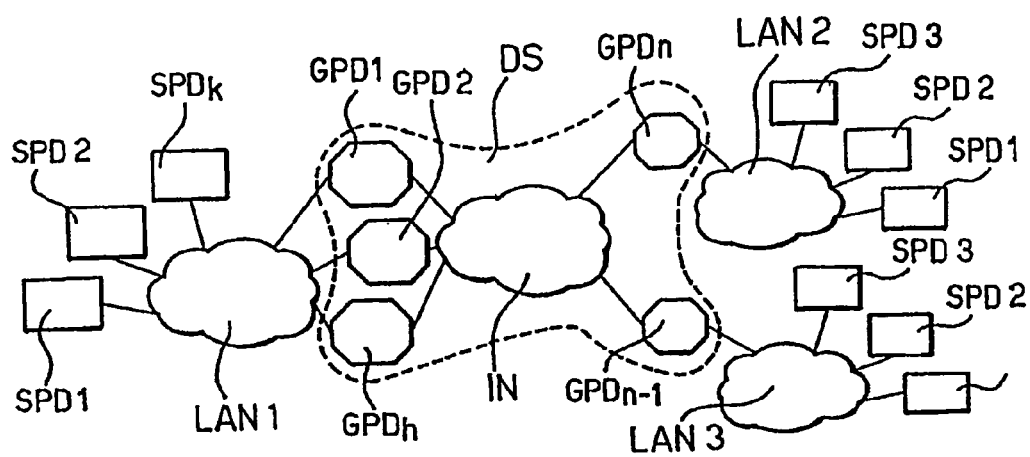
FIG..5
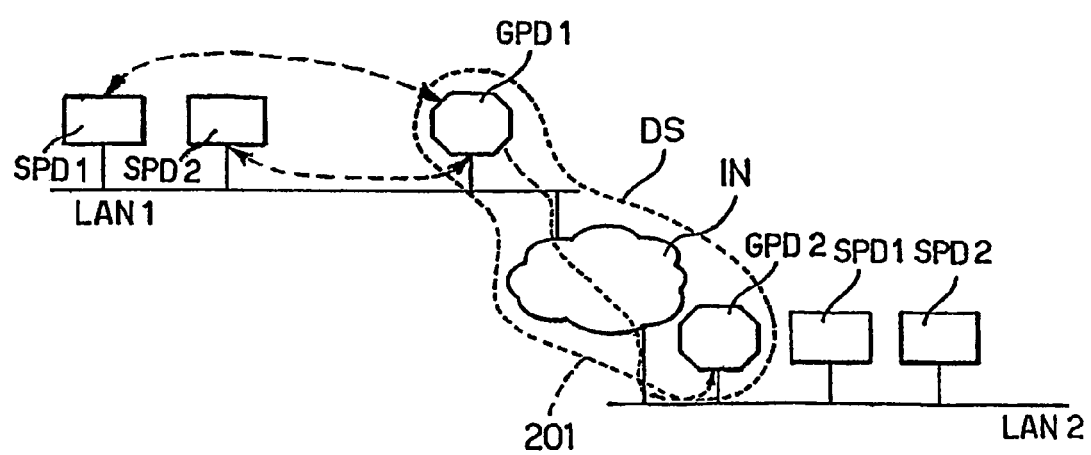
FIG..6

METHOD AND SYSTEM FOR FAULT PROTECTION IN COMMUNICATION NETWORKS, RELATED NETWORK AND COMPUTER PROGRAM PRODUCT

CROSS REFERENCE TO RELATED APPLICATION

This application is a national phase application based on PCT/EP2003/011196, filed Oct. 9, 2003, the content of which is incorporated herein by reference.

1. Field of the Invention

The invention relates to techniques for fault protection in communication networks.

1. Description of the Related Art

In general terms, a "fault" can be defined as an unexpected hardware or software failure in a device, one of its components or sub-systems, and/or in a network including the device. Quite different levels of faults may thus occur in a communication network ranging from power up to software failures, and including faults that are recoverable (e.g. temporary overloads) and faults that are not recoverable (e.g. hardware crashes).

Many solutions have thus been devised in order to avoid, remove, tolerate or escape faults in typical network devices in telecommunications environments (e.g. PSTN, TCP/IP, PLMN and so on: the captioned acronyms have well known meanings that do not require specific explanations).

Current approaches (e.g. U.S. Pat. No. 6,148,410 bears witness to this) are based on redundancy techniques that essentially duplicate the device protected or some of its components (hard disks, network interface cards, processors, memory): if one of these fails, a "copy" of the faulty device can take over.

Faults can be managed in at least two basic ways, depending on the level of protection required.

A first basic approach (often referred to as "passive" mode), provides for copies coming into play only if the device protected (or one of its components) fails.

A second basic approach (often referred to as "active" mode) provides for the copies being operated in parallel with the devices protected in order to be immediately available for substituting the device protected if a fault occurs.

Any other remarks apart, these techniques imply a significant system overhead. This has an appreciable impact both in terms of economics (dedicated hardware copies are often underloaded) and in terms of "physical" occupation (i.e. space requirements).

Certain proposals have been made for arrangements that exploit redundancy in a particularly efficient manner e.g. by improving the reliability of a communication chain by dynamically regenerating intermediate elements in the chain (see M. Taghelit et al. "An Algorithm providing Fault-Tolerance for Layered Distributed Systems: Specification and Testing Using ESTELLE"; ISMM International Workshop on PARALLEL COMPUTING, 10-13 Sep. 1991, Trani, Italy). Any other remarks apart, such an arrangement has the basic disadvantage of requiring a substantial re-design of the network involved.

Additionally, the number of failures tolerated in most prior art arrangements is inevitably limited, and proportional to the actual number of copies available.

The issue of fault protection has been extensively investigated within the framework of "clustered" systems, with the primary aim of improving the internal dependability of the cluster itself.

Exemplary of this approach is the arrangement disclosed in U.S. Pat. No. 5,805,785.

Specifically, in U.S. Pat. No. 5,805,785 a system and method are disclosed for a general and extensive infrastructure providing monitoring and recovery of interdependent systems in a distributed/clustering system. Subsystems, built without provision for high availability, are incorporated into the infrastructure without modification to core subsystem function. The infrastructure is comprised of one or more computing nodes connected by one or more interconnection network, and running one or more distributed subsystems. The infrastructure monitors the computing nodes using one or more "heartbeat" and membership protocols and monitors the distributed subsystems by subsystem-specific monitors. Events detected by monitors are sent to event handlers that filter them. Filtered events are given by event managers to recovery drivers which determine the recovery program corresponding to the event and executing the recovery program or set of recovery actions by coordination among the recovery managers. Given failures in the event handlers or recovery managers, the infrastructure performs additional steps for coordinating the remaining event handlers and recovery managers to handle completion or termination of ongoing recovery actions.

Applicants remark that U.S. Pat. No. 5,805,785 discloses a configuration wherein clustered devices (homogeneous devices) are configured for helping one another and how a clustered device or node can be substituted from another in the presence of failures, thus making it possible for the clustered devices to support one another.

In the following the term general purpose devices (GPD) is used for indicating devices having the same kind of nature in terms of software functionalities and able to communicate with each other by means of installed compatible software components, as for example Personal Computers.

In the present invention the term general purpose devices is used for indicating devices that are configurable to perform network functions.

Moreover, the term "Clustered Devices" is used for indicating general purpose devices belonging to a clustering system.

In general the term general purpose devices (GPD), according to present invention, does not refer, necessarily, to devices having same hardware or operating system.

Other documents of some interest in this scenario are U.S. Pat. No. 6,088,328, that discloses a system and a method for restoring failed communication services, and U.S. Pat. No. 6,078,957, wherein a method and apparatus are disclosed for a TCP/IP load balancing and fail over process in an internet protocol (IP) network clustering system.

OBJECT AND SUMMARY OF THE INVENTION

Applicants have felt the need for fault protection arrangements adapted to be implemented in a distributed manner and which may support systems comprising intrinsically non-homogeneous devices/components such as stand-alone machines (e.g. routers, cache units, storage devices, and so on) typically included in a telecommunication network, with the preferable provision of a resource on-demand feature.

The object of the present invention is thus to meet the need outlined in the foregoing.

According to the present invention, that object is achieved by means of a method having the features set forth in the claims that follows. The invention also relates to a corresponding system as well as a related communication network and computer program product loadable in the memory of at least one computer and including software code portions for performing the steps of the method of the invention when the product is run on at least one computer.

Reference to "at least one computer" is evidently intended to highlight the possibility for the invention to be carried out in a decentralized manner over a plurality of machines.

A preferred embodiment of the invention exploits an advanced distributed system (DS) arrangement or clustering system for improving fault protection of "external" devices, that is devices that do not belong to the clustering system (DS) and are not homogenous with the devices included in the distributed or clustering system (DS).

A typical area of application of the arrangement described herein is fault protection of special purpose devices (SPDs)—i.e. devices performing specific network functions, typically having function specific hardware such as routers, storage devices for data archiving, caches for content delivery and so on—through the use of general purpose devices .(GPDs) that are interconnected in a distributed system (DS) environment or clustering system and share resources.

A typical embodiment of the invention thus provides fault protection of special purpose devices included in at least one communication network and performing respective functions by means of the steps of:

providing a set of general purpose devices adapted to be configured to perform said respective functions, and in the presence of a faulty condition in any of said respective functions of the special purpose devices (SPDs), applying at least one of the general purpose devices (GPDS) in performing the respective function exposed to the faulty condition.

Preferably, each GPD belonging in the distributed system (DS) is connected through a local network with the other devices to be protected: a GPD can thus replace an SPD (or some of its functions/components) by requesting additional resources from other GPDs in the system.

The system in question is generally assumed to be a network of GPDs connected via usual technologies (e.g. IP/ATM/Optical networks) and offering the capability of sharing resources (in terms of CPU, disks, memory, network capabilities, network access rights, etc.) among GPDS. This choice is intended to overcome the limitations of a single general purpose device when substituting a special purpose one.

Preferably, a "probe" facility is provided for sending specific requests to the other machines in the system.

BRIEF DESCRIPTION OF THE ENCLOSED DRAWINGS

Figure 4:
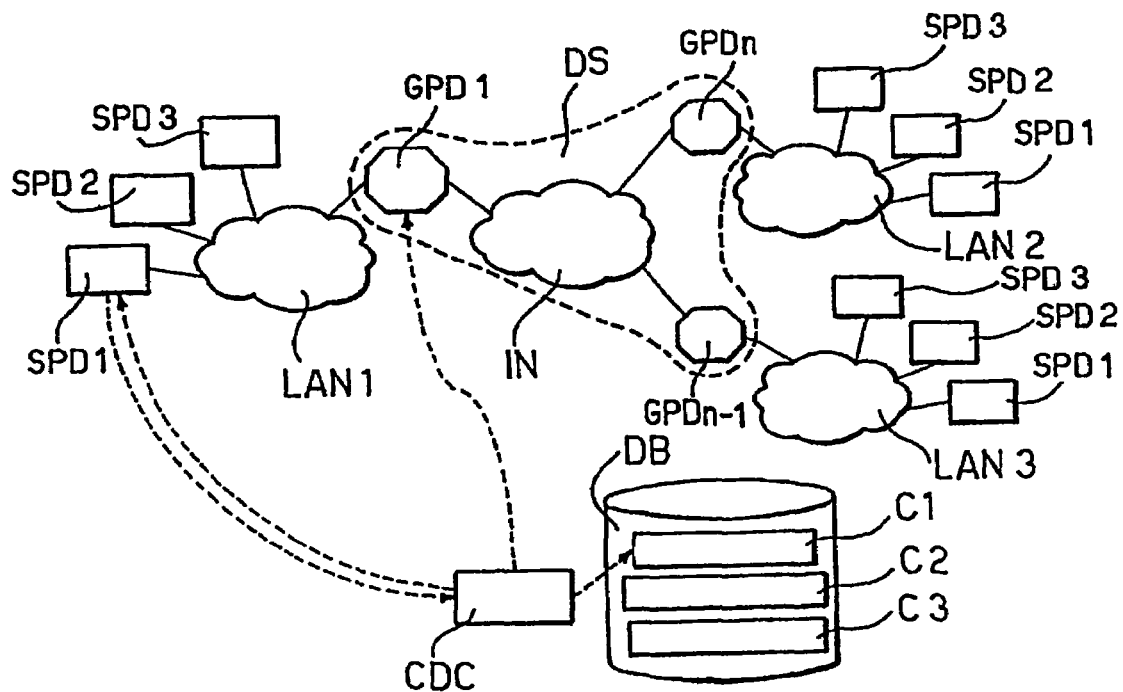

The invention will now be described, by way of example only, with reference to the enclosed figures of drawing, wherein:

FIG. 1 is a block diagram showing a possible physical scheme of the arrangement described herein, FIG. 2 is a block diagram showing a possible logical scheme of the arrangement described herein, FIG. 3 shows the switching process between an SPD and a GPD in the arrangement described herein, FIG. 4 shows a first alternative logical scheme for the fault protection action in the arrangement described herein, FIG. 5 shows a second alternative logical scheme for the fault protection action in the arrangement described herein, and FIG. 6 represents a practical example of implementation of the arrangement described herein.

DETAILED DESCRIPTION OF PREFERRED EMBODIMENTS OF THE INVENTION.

The exemplary system described herein is primarily intended to protect from faults network devices in the form of special purpose devices (SPDs).

An SPD can be a typical device used in TCP/IP networks (e.g. a router or switch for traffic forwarding, a storage device for data archiving, a cache for content delivery and so forth).

It may also be any other kind of special purpose device, including typical PSTN, PLMN, FR, ATM, X.25 devices: as already indicated in the foregoing the acronyms used throughout this description are of common usage in the area of telecommunication networks, which makes it unnecessary to provide an explanation of their meanings.

In order to accomplish its role, the SPD may have dedicated hardware and/or software.

Fault protection is achieved by means of general purpose devices (GPDs) interconnected in a distributed system (DS) able to provide resource sharing among its GPDs. Resource sharing typically involves CPU disks, memory, network capabilities, network access rights, and any other resource adapted to be shared.

The distributed system described herein is of the kind currently referred to in the literature as a "grid" system or a "clustering" system. In this latter respect, it will be appreciated that the system designated DS will typically take the form of a clustering system adapted to ensure fault protection in the components/elements in one or more networks that—per se—are not elements of the cluster.

As used herein, "protection" is generally intended to mean any of the actions/effects currently referred to as e.g. "avoidance", "removal" "tolerance" and "evasion", that is any of the actions/effects that can be achieved in a fault protection scheme as a function of the different levels of protection to be achieved.

Specifically, fault avoidance is generally intended to refer to systems being designed in such a manner that the introduction of faults is minimized.

Fault removal is generally intended to mean the ability of locating faults, thus enabling the necessary changes to be made to the system.

Fault tolerance is generally intended to mean the ability of maintaining system operation, possibly at a degraded level, in the presence of faults.

Fault evasion is generally intended to mean the monitoring a system for detecting any deviations from its normal behavior in order to take actions to compensate for faults before they occur.

It will thus be appreciated that, as used in this description and the claims that follow, the expression "exposed to a faulty condition" will generally be intended to cover, in addition to a situation where a fault has already occurred in the protected network, also the situation where such a fault may be reasonably expected/predicted to occur in the future.

FIG. 1 shows one possible physical embodiment of the arrangement disclosed herein.

The distributed system DS interacts with typical network areas and data flows. Specifically, the block diagram of FIG. 1 shows e.g. two networks comprised of a number of SPDs designated SPD1, SPD2, . . . connected over respective local area networks LAN1, LAN2. These are in turn arranged to exchange data flows DF with a "geographic" network N such as the Internet.

The system DS typically includes a plurality of GPDs, e.g. GPD1, GPD2, . . . connected over an internal network IN.

FIG. 2 shows the logical scheme of the system of FIG. 1 with the same components (SPDs, GPDs and DS) and within the same environment (networks and interconnections): in the case of FIG. 2, three networks LAN1, LAN2 and LAN3 are shown in order to highlight the possibility for the arrangement described herein to co-operate with any number of communication networks.

The dotted line 201 represents the region that bounds the DS area: the GPDs which are inside this area can share resources. Elements (e.g. SPDS) outside that region are considered as stand-alone devices not belonging to the DS.

FIG. 3 shows the internal architecture of an SPD as a collection of functions F1, F2, F3 and F4 adapted to receive input data and generate therefrom output data. For instance a router can be seen as a collection of forwarding, routing table lookup and routing table computation functions.

The internal architecture of a GPD is the typical architecture of a machine equipped with a generic operating system OS adapted to run (in a native way or by source code uploads) optimized software modules e.g. F4 adapted to perform any specific function (e.g. routing table computation) currently performed by the SPDs in the network protected.

In addition to one or more function modules F1, F2, F3, . . . the generic internal architecture of an SPD also includes a fault handler FH, which is the supervisor of critical parameters.

The fault handler FH is adapted to detect and communicate the actual/expected occurrence of a fault according to any known mechanism: for instance, the fault handler FH may decide in case certain thresholds are exceeded that one or more functions F1, F2, F3, . . . can no longer be properly supported by the respective SPD.

A fault handler FH already is an explicit part of (or an ad-hoc module associated with) an SPD when designed for fault-protection using duplication techniques according to the prior art.

Conversely, a GPD is a generic device with no dedicated hardware or software but just having a generic operating system and the capability of being a node of the system DS.

In addition to enabling resource sharing (such as sharing of CPUs, disks, memory units, network capabilities, network access rights, and so on) on a wide scale among the GPDs included therein, the system DS may include other optional features such as programmability (intended as the capacity of specific behaviors of its nodes based on the uploading of the software code required), high performance data transfer, security, QoS, internal fault tolerance, service discovery and so on.

The GPDs in the system DS preferably reside in the same local area of a group of SPDs, in order to be promptly available for answering requests from SPDs. However, the GPDs can also be arranged at remote locations if a fast connection is available or no specific timing requirement is to be met.

Each GPD has basically two states, namely:
 an active state, which means that the GPD is currently running some functions on behalf of some SPDs, and
 a passive state, which means that the GPD is at standby, not running any backup function and thus being able to make its own resources available to other GPDs requesting them.

Intermediate states can be possibly defined in order to improve readiness and dependability.

A GPD in the system DS can protect an SPD in any of the networks LAN1, LAN2, LAN3, . . . either by fully substituting it or by running one or more of its internal functions. An GPD can also protect several SPDs by running one or more of their internal functions concurrently.

GPDs can be configured to "cover" faulty hardware and software functions in any of the SPDs in by resorting to hardware and software modules, respectively. Additionally, certain features currently implemented in a SPD in hardware form can be "covered" by software module(s) in the GPD until the failure can be recovered.

As shown in FIG. 3, if one or more critical parameters in the SPD exceed a threshold which is held to be indicative of a "fault" (actual or expected), the fault handler FH asks a GPD in the system DS to take over the responsibility for the functions affected.

The protocol used for passing messages FS between the SPD and the GPD may be a proprietary one or any of a suitable kind based on standards: as indicated, fault handlers FH are typically already currently present in the SPDs and, as such, are already configured for using given communication protocols.

As soon as a GPD in the system DS is contacted by a "faulty" SPD, the GPD identifies the kind of function to be reproduced and checks its ability to substitute the faulty SPD in performing the function(s) at the basis of the faulty condition.

This result may be obtained by means of resources that already reside in the GPD itself and/or are supplied from outside. If additional resources are found to be needed, the GPD in question looks for these resources e.g. possibly requiring these resources to be made available from outside, e.g. by uploading corresponding code segments. This preferably occurs by referring to other GPDs in the system DS, in order to be in a position to provide the functions needed.

The GPD can thus be configured to cover any kind of software and (at least in principle) hardware faults by implementing any function exposed to a faulty condition in the SPDs.

In the practical example of FIG. 6, GPD1 is already running in an active mode to protect a first SPD such as SPD1: this can be, e.g., the router of LAN1, which communicates with GPD1 through protocols like e.g. HSRP.

If GPD1 is called in to protect also another SPD, such as SPD2 (e.g. the storage device of LAN1, which communicates with GPD1 through typical protocols for fail-over management of storage servers for instance), GPD1 will check its internal storage resources. If these available resources are not sufficient for the purpose, GPD1 will refer to the system DS for additional storage resources.

The system DS is generally provided with a "self-awareness" function, that causes the system to hold information as to what resources are available in the system and where these resources are located. The system DS will thus be able to redirect the request, for instance, to another general purpose computer in the system DS such as e.g. the computer GPD2 that is running in passive mode and moreover may e.g. have to protect SPDs nearby (e.g. SPD1 and SPD2 in LAN2) only in terms of processing and network resources.

GPD2 will thus be available to lend at least a part its storage capacities to GPD1.

As GPD1 gets from GPD2 the additional storage resources requested, GPD1 start protecting also the storage device SPD2 in LAN1.

FIG. 4 shows a possible variation in the arrangement just described: a new component, called a code distribution center CDC is introduced, which is a centralized forwarding point of requests coming out from SPDs.

The center CDC manages a database DB that contains code segments such as e.g. source code segments C1, C2, C3, . . . jointly comprising a collection of software code portions adapted to perform the functions currently performed by the SPDs in the network(s) to which the system DS provides fault protection.

A possible behaviour of the arrangement shown in FIG. 4 may be as follows.

The fault handler FH of any "faulty" SPD will be configured to contact (either directly or via the system DS) the center CDC—in the place of a given GPD—asking for a specific function. The center CDC will in turn select the right source code and send it to a given GPD in the system DS. The GPD involved will instal the code received from the center CDC, get that code running and declare itself ready to switch and take charge of the faulty function.

The center CDC will thus send a "switch ready" message to the faulty SPD which can now delegate the affected function to the GPD, turning off its local function processing.

In order to be able to select within the system DS a given GPD to be entrusted with a specific back-up function, the center CDC will generally store information concerning the locations and/or characteristics of the various GPDs in the system DS. The center CDC will thus be able to select the GPD that—at least at the moment—is most suitable for providing the required back-up function.

The arrangement just described is particularly advantageous in that it permits e.g. to store in the center CDC the latest available versions/releases of the software segments $C1, C2, C3, \ldots$, thus making it possible to ensure continued update of the system DS.

As schematically shown in FIG. 5, SPDs can request protection not only from "local" GPDs but also from remote ones, in order to improve performance and dependability. In general, in the arrangement shown herein, h GPDs are used in each local area to protect k SPDs (with $h<<k$).

It is thus evident that, the basic principles of the invention remaining the same, the details and embodiments may widely vary with respect to what has been described and illustrated purely by way of example, without departing from the scope of the presented invention as defined in the annexed claims.

The invention claimed is:

1. A method of providing fault protection of special purpose devices included in at least one communication network and performing respective functions comprising the steps of:
   providing a set of general purpose devices adapted to be configured to perform said respective functions;
   including in said special purpose devices a fault handler module; and
   in the presence of a function exposed to a faulty condition in any of said special purpose devices, applying at least one of said general purpose devices in performing said respective function exposed to said faulty condition by locating said faulty condition in the respective special purpose device by means of said fault handler module and issuing a request for a qeneral purpose device in said set to be applied in performing said function exposed to said faulty condition.

2. The method of claim 1, comprising the step of substituting a faulty hardware function performed in one of said special purpose devices by means of a software function performed by a general purpose device in said set.

3. The method of claim 1, comprising the step of transferring resources needed to perform said respective function exposed to a faulty condition to a general purpose device in said set.

4. The method of claim 1, comprising the steps of:
   configuring said general purpose devices in said set for resource sharing; and
   transferring resources needed to perform said respective function exposed to a faulty condition to a general purpose device in said set from another general purpose device in said set.

5. The method of claim 1, comprising the step of arranging said set of general purpose devices in a distributed system.

6. The method of claim 1, comprising the step of associating with said set of general purpose devices a distribution center storing code segments adapted to be transferred to said general purpose devices in said set to configure them to perform said respective functions exposed to said faulty condition.

7. The method of claim 6, comprising the steps of:
   configuring said distribution center for receiving from said special purpose devices requests indicative of a faulty condition in said special purpose devices; and
   upon receiving any said request, sending from said distribution center a set of code segments for performing a respective function exposed to said faulty condition to at least one general purpose device in said set thereby configuring said general purpose device to substitute the special purpose device exposed to said faulty condition in performing said respective functions.

8. A computer program product loadable in the memory of at least one computer and including software code portions capable of performing the steps of the method of any one of claims 1 and 2 to 7.

9. A system for providing fault protection of special purpose devices included in at least one communication network and performing respective functions comprising a set of general purpose devices adapted to be configured to perform said respective functions in the presence of a function exposed to a faulty condition in any of said special purpose devices; wherein a fault handler module is included in each special purpose device for locating said faulty conditions in respective special purpose devices and issuing requests for a general purpose device in said set to be applied in performing said function exposed to said faulty condition.

10. The system of claim 9, comprising software code portions in said set of general purpose devices, said software code portions being adapted to implement faulty hardware functions performed in at least one of said special purpose devices.

11. The system of claim 9, comprising a communication facility adapted for transferring resources needed to perform said respective function exposed to a faulty condition to a general purpose device in said set.

12. The system of claim 9, comprising said general purpose devices in said set configured for resource sharing, and a communication facility adapted for transferring resources needed to perform said respective function exposed to a faulty condition to a general purpose device in said set from another general purpose device in said set.

13. The system of claim 9, wherein said set of general purpose devices are arranged in a distributed system.

14. The system of claim 9, comprising a distribution center storing code segments associated with said set of general purpose devices, said distribution center storing code segments adapted to be transferred to said general purpose devices in said set to configure them to perform said respective functions exposed to said faulty condition.

15. The system of claim 14, comprising said distribution center configured for receiving from said special purpose devices requests indicative of a faulty condition in said special purpose devices, and, upon receiving any said request, sending from said distribution center a set of code segments for performing a respective function exposed to said faulty condition to at least one general purpose device in said set, thereby configuring said general purpose device to substitute the special purpose device exposed to said faulty condition in performing said respective functions.

16. A communication network having associated a fault protection system according to any one of claims 9 and 10 to 15.

* * * * *